(12) United States Patent
Ukon

(10) Patent No.: US 8,229,419 B2
(45) Date of Patent: Jul. 24, 2012

(54) COMMUNICATION APPARATUS

(75) Inventor: Tsutomu Ukon, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 652 days.

(21) Appl. No.: 12/055,988

(22) Filed: Mar. 26, 2008

(65) Prior Publication Data
US 2008/0242334 A1 Oct. 2, 2008

(30) Foreign Application Priority Data
Mar. 27, 2007 (JP) ................................. 2007-082243

(51) Int. Cl.
*H04W 4/00* (2009.01)
(52) U.S. Cl. ...................... 455/426.1; 455/462; 455/465; 379/214.01; 379/207.04
(58) Field of Classification Search .................. 455/403, 455/426, 426.1, 462, 465, 517, 566; 370/201.01, 370/201.04, 207.04, 214.01; 379/201.01, 379/201.04, 207.04, 214.01
See application file for complete search history.

(56) References Cited

U.S. PATENT DOCUMENTS

| | | | | |
|---|---|---|---|---|
| 5,546,454 A * | 8/1996 | Harrington | ............... | 379/266.01 |
| 5,687,218 A * | 11/1997 | Nakayama | .................... | 455/415 |
| 5,802,477 A | 9/1998 | Mizokami et al. | | |
| 5,805,999 A | 9/1998 | Inoue | | |
| 5,890,069 A * | 3/1999 | Evans et al. | .................... | 455/462 |
| 6,055,445 A * | 4/2000 | Hiroki | ........................... | 455/566 |
| 6,208,868 B1 | 3/2001 | Kim | | |
| 7,260,414 B2 * | 8/2007 | Hassan et al. | .................. | 455/518 |
| 7,308,086 B2 * | 12/2007 | Yoshitani | .................... | 379/93.07 |
| 7,590,086 B2 * | 9/2009 | Olkkonen et al. | ............. | 370/328 |
| 2002/0082000 A1 * | 6/2002 | Sakai et al. | .................... | 455/414 |
| 2002/0115455 A1 * | 8/2002 | Umstetter et al. | ............. | 455/462 |
| 2002/0183075 A1 * | 12/2002 | Fauconnier | .................... | 455/456 |
| 2003/0003866 A1 * | 1/2003 | Overy et al. | ...................... | 455/41 |
| 2003/0061066 A1 * | 3/2003 | Ochiai | ............................. | 705/1 |
| 2006/0003783 A1 * | 1/2006 | Fukui et al. | ................... | 455/517 |
| 2006/0046750 A1 * | 3/2006 | Deschenes | ..................... | 455/462 |
| 2008/0113665 A1 * | 5/2008 | Paas et al. | ................... | 455/426.1 |

FOREIGN PATENT DOCUMENTS

| | | |
|---|---|---|
| GB | 2298106 A | 8/1996 |
| JP | 09-233548 | 9/1997 |
| JP | 363257363 | * 10/1998 |
| JP | 2002-033817 A | 1/2002 |
| JP | 2005-123717 | 5/2005 |
| JP | 2005-223421 A | 8/2005 |

OTHER PUBLICATIONS

Notice of Reasons for Rejection, mailed Feb. 12, 2009 for counterpart Japanese Patent Application No. 2007-082243.
European search report for application No. 08005783.9 mailed Sep. 9, 2009.

* cited by examiner

*Primary Examiner* — Kamran Afshar
*Assistant Examiner* — Marisol Fahnert
(74) *Attorney, Agent, or Firm* — Banner & Witcoff, Ltd.

(57) ABSTRACT

A cordless handset receives status information from two or more base units indicating at least one of a waiting status and a non-waiting status. The non-waiting status may further include an internal-line-call status and/or an external-line-call status. The cordless handset may display the status information on a display with the status information corresponding to the base units.

16 Claims, 16 Drawing Sheets

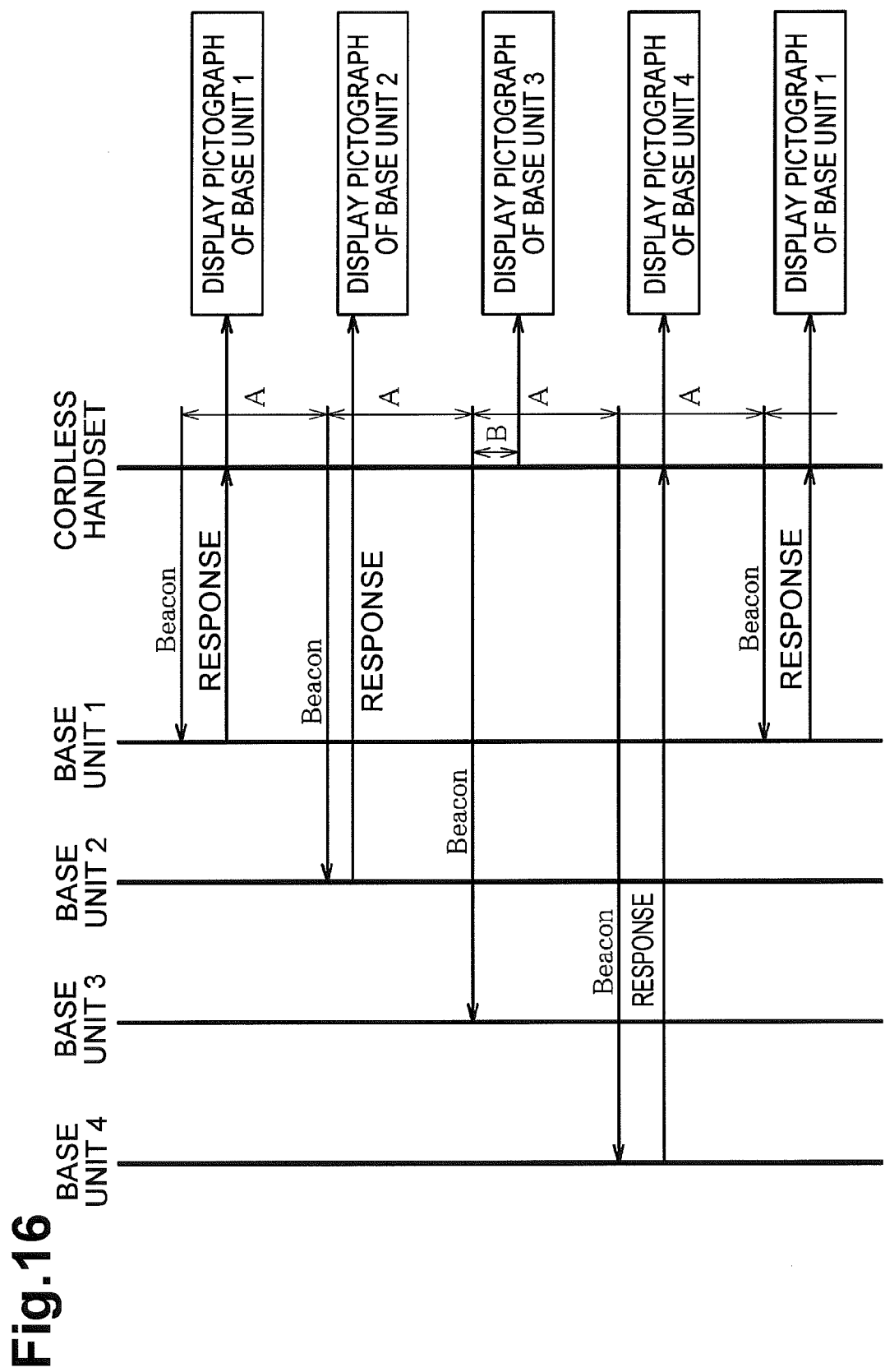

COMMUNICATION APPARATUS

BACKGROUND

1. Technical Field

Aspects of the present invention relate to communication apparatuses.

2. Description of the Related Art

There exists a type of communication system constituted by one base unit and two or more cordless handsets and in which communication between the base unit and the cordless handsets, communication among the cordless handsets, and communication between the base unit or the cordless handsets and external apparatuses are allowed.

Similarly to such a type of communication system, there also exists a type of communication system constituted by a plurality of types of base units and one cordless handset and in which the cordless handset can communicate with the plurality of types of base units.

For example, one conventional approach includes a communication system in which a cordless handset is capable of communicating with a selected one of different types of base units. According to this conventional approach, compared with a case where the same number of cordless handsets as the number of base units is needed, cost of cordless handsets can be reduced.

Although this conventional approach describes that a cordless handset can communicate with a selected one of the base units, this conventional approach does not disclose the cordless handset obtaining status information from two or more of the base units.

SUMMARY

At least one aspect of the invention provides a communication system in which a cordless handset may receive information from a plurality of base units, where the information may include connection-status information. Another aspect of the invention relates to a cordless handset that may be used with two or more base units and receive connection-status information from the base units. Yet a third aspect of the invention relates to a base unit that may be used with a cordless handset that can obtain connection-status information from the base unit and other base units.

BRIEF DESCRIPTION OF THE DRAWINGS

FIG. 16 is a diagram showing exchange of signals between base units and a cordless handset.

DETAILED DESCRIPTION

Figure 1:
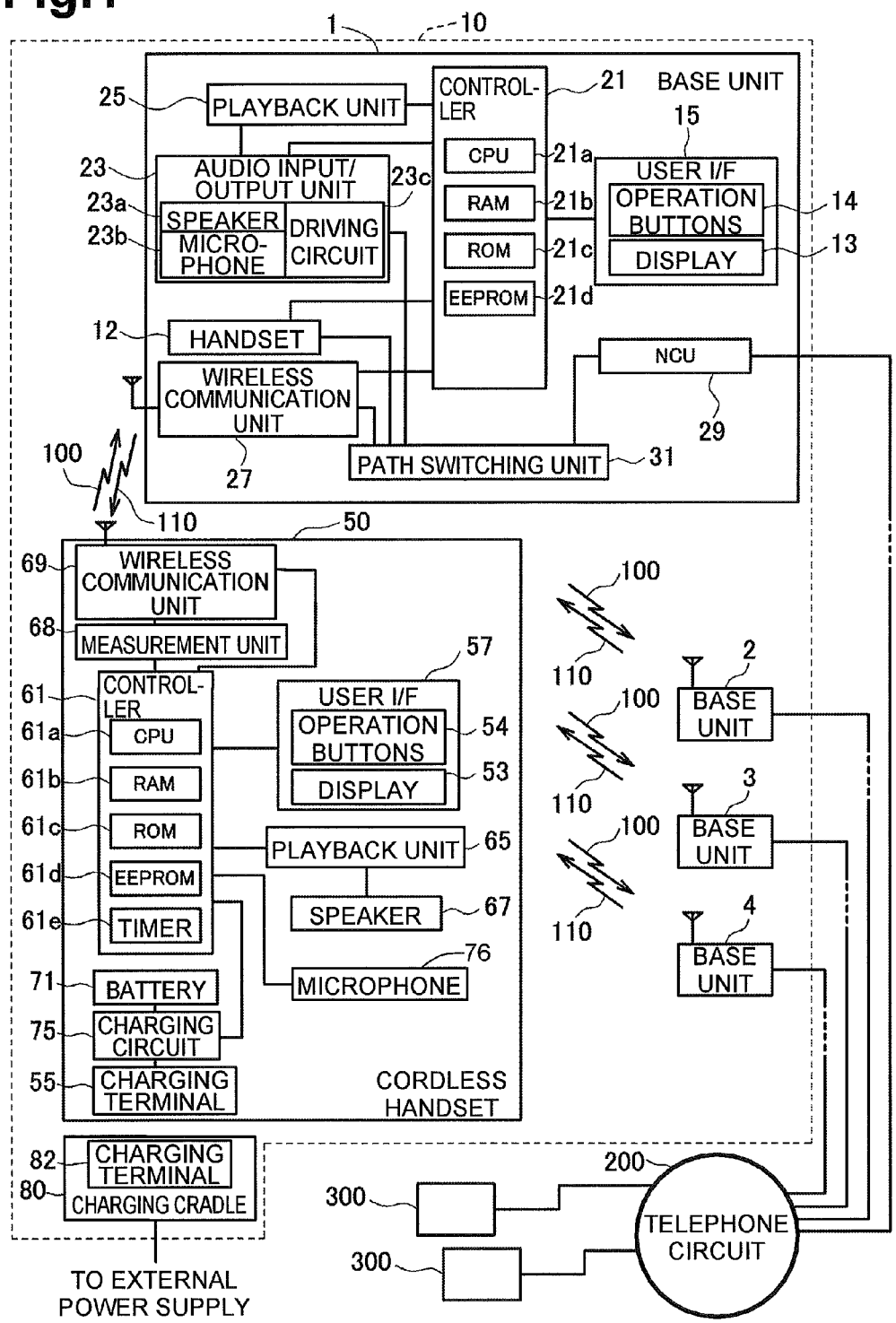
FIG. 1 is a block diagram schematically showing the configuration of a cordless phone according to a first embodiment.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between elements in the following description. It is noted that these connections in general and, unless specified otherwise, may be direct or indirect and that this specification is not intended to be limiting in this respect.

General Description of One or More Aspects of Invention

The following generally describes one or more aspects of the invention. In a first aspect, a communication system may include two or more base units and a cordless handset configured to communicate wirelessly with each of the two or more base units. The cordless handset may include a display and a controller that is configured to obtain connection-status information from at least one of the two or more of base units, the connection-status information indicating whether the corresponding base unit is performing communication, and is configured to control the display to display the connection-status information.

In the communication apparatus described above, the cordless handset may obtain connection-status information of each base unit and may display the connection-status information. Thus, in an example of the above apparatus, a user of the cordless handset may be able to quickly determine a base unit that the cordless handset can currently communicate with and/or a base unit through which the cordless handset can currently communicate.

In the communication apparatus described above, for example, as the connection-status information, the controller may obtain 1) information indicating a waiting status, 2) information indicating an internal-line-communication status, or 3) information indicating an external-line-communication status. The waiting status may include where the base unit is not performing communication with any other one of the two or more of base units, the cordless handset, or the external apparatus, The internal-line-communication status may include where the base unit is performing internal-line communication with the cordless handset, The external-line communication status may include where the base unit is performing external-line communication with one of the other base units or the external apparatus. The controller may then control the display to display information in such a manner that the waiting status, the internal-line-communication status, and the external-line-communication status are distinguishable from each other.

In this case, by having the various statuses visually distinguishable from each other, the user of the cordless handset according to one aspect of the invention may be able to more readily recognize a base unit that the cordless handset can currently communicate with and a base unit through which the cordless handset can currently communicate.

Furthermore, in accordance with one or more examples of the present invention, a communication apparatus may further include electric-field intensity detecting circuit that detects an electric-field intensity of a signal exchanged by wireless communication between each of the two or more of base units and the cordless handset. The controller may then control the display to display the connection-status information obtained by the controller and the electric-field intensity detected by the electric-field intensity detecting means in such a manner that the connection-status information and the electric-field intensity are associated with the corresponding one of the two or more of base units.

In this example, since the cordless handset may display the electric-field intensity detected by the electric-field intensity detecting circuit in addition to the connection-status information in association with the corresponding base unit, the user of the cordless handset may be able to more readily recognize connection-status information and electric-field intensity of each base unit. Thus, the user of the cordless handset may then be able to more quickly recognize a base unit that the cordless handset can currently communicate with and a base unit through which the cordless handset can currently communicate favorably.

Furthermore, in the communication apparatus described above, for each of the two or more of base units, the controller may display an identification code identifying the base unit, the connection-status information for the base unit, and the electric-field intensity for the base unit in an area on the display.

In this case, since the display may display an identification code identifying the base unit, the connection-status information for the base unit, and the electric-field intensity for the base unit in a predefined shape, even if the size of the display of the cordless handset is small, information can be conveyed effectively. Thus, the user of the cordless handset may be able to more quickly recognize a base unit that the cordless handset can currently communicate with and a base unit through which the cordless handset can currently communicate favorably.

First Embodiment

Now, a first embodiment of the present invention will be described with reference to the drawings.

The first embodiment will be described in the context of a case where a cordless handset obtains information as to whether each base unit is in a waiting status from the base unit and displays the information on a display.

FIG. 1 is a block diagram schematically showing the configuration of a cordless phone 10 (communication apparatus) according to this embodiment.

The cordless phone 10 includes a cordless handset 50, two or more of base units 1, 2, 3, and 4, and a charging cradle 80.

Although the number of base units is not limited according to the present invention, for convenience of description, this embodiment will be described in the context of an example where four base units 1, 2, 3, and 4 are provided.

Since the internal configurations of the four base units are the same, only the internal configuration of the base unit 1 will be described below and description of the internal configurations of the other base units will be omitted.

First, the configuration of the base unit 1 will be described.

The base unit 1 includes a controller 21 that controls the base unit 1 as a whole, and a handset 12, an audio input/output unit 23, a user interface (hereinafter abbreviated as a user I/F) 15, a wireless communication unit 27, a network control unit (NCU) 29, and a path switching unit 31 that are electrically connected to the controller 21.

The controller 21 includes a central processing unit (CPU) 21a that is in charge of controlling the base unit 1 as a whole, a read-only memory (ROM) 21c that stores programs executed by the CPU 21a, a random access memory (RAM) 21b that stores various types of data used when the programs are executed, and an electrically erasable programmable read-only memory (EEPROM) 21d that stores various types of data used when the programs are executed similarly to the RAM 21b and that can maintain data stored therein even when the supply of a power supply voltage is stopped.

The audio input/output unit 23 includes a speaker 23a, a microphone 23b, and a driving circuit 23c for driving the speaker 23a and the microphone 23b. In addition to outputting sound based on audio signals from the speaker 23a, the audio input/output unit 23 is configured so as to allow what is called hands-free conversation using the speaker 23a and the microphone 23b as an earpiece and a mouthpiece.

The handset 12 allows conversation with an external communication terminal 300 or the cordless handset 50. The handset 12 includes a microphone and a speaker (not shown) inside thereof.

The handset 12 allows adjustment of the speaker volume and so forth, and the adjusted value of volume is stored in the RAM 21b of the controller 21.

The handset 12 is usually placed on a cradle 80 provided on the base unit 1, and is picked up from the cradle when it is used.

The audio input/output unit 23 is a device that allows conversation with the external communication terminal 300 or the cordless handset 50 with the handset 21 placed on the cradle 80 (what is called hands-free conversation) or allows listening to messages recorded by an answering system. The audio input/output unit 23 includes the speaker 23a, the microphone 23b, and the driving circuit 23c for driving the speaker 23a and the microphone 23b.

The driving circuit 23c is electrically connected to a playback unit 25 electrically connected to the controller 21, and transmits electric signals output from the controller 21 to the speaker 23a via the playback unit 25.

Electric signals output from the microphone 23b via the driving circuit 23c are directly transmitted to the controller 21.

The playback unit 25 plays back various audio signals based on electric signals output from the controller 21.

More specifically, the playback unit 25 stores audio signals of a ringing tone that is used when the base unit 1 receives a call, a holding tone sound that is used when holding a phone conversation, and so forth, and plays back the audio signals as needed according to instructions from the controller 21.

The user I/F 15 has operation buttons 14 provided on the base unit 1 and a display 13.

The wireless communication unit 27 sends and receives various types of signals 100 and 110, including audio signals, to and from the cordless handset 50 by wireless communication.

In addition to audio signals, commands or the like can also be sent from the cordless handset 50, and the commands or the like are stored in the RAM 21b or the EEPROM 21d of the controller 21.

The NCU 29 allows input and output of audio data or image data with the external communication terminal 300 via a telephone circuit 200.

In addition to audio signals, image data can also be sent from the external communication terminal 300, and the image data is stored in the RAM 21b of the controller 21.

The path switching unit 31 switches the transmission path of audio signals in the base unit 1 when an operation for starting a call has been performed. More specifically, the path switching unit 31 switches the transmission path of audio signals input from the external communication terminal 300 via the NCU 29 among the handset 12, the audio input/output unit 23, and the wireless communication unit 27.

For example, when the handset 12 has been picked up from the cradle 80 of the base unit 1, the path switching unit 31 switches the transmission path to the handset 12. When an operation for starting hands-free conversation has been performed using the operation buttons 14 of the user I/F 15, the path switching unit 31 switches the transmission path to the audio input/output unit 23. When an operation for starting a call using the cordless handset 50 has been performed (an operation using operation buttons 54 described later), the path switching unit 31 switches the transmission path to the wireless communication unit 27.

The cordless handset 50 includes a controller 61 that controls the operation of the cordless handset 50 as a whole, and a speaker 67, a microphone 76, a cordless-handset user interface (hereinafter abbreviated as a cordless-handset user I/F) 57, a wireless communication unit 69, a measurement unit 68, and a charging circuit 75 that are electrically connected to the controller 61.

The controller 61 includes a CPU 61a that is in charge of controlling the cordless handset 50 as a whole, a ROM 61c that stores programs executed by the CPU 61a, a RAM 61b that stores various types of data used when the programs are executed, an EEPROM 61d that stores various types of data used when the programs are executed similarly to the RAM 61b and that can maintain data stored therein even when the supply of a power supply voltage is stopped, and a timer 61e for measuring time.

The speaker 67 converts electric signals output from the controller 61 into sound via a playback unit 65 and outputs the sound.

The microphone 76 directly transmits sound to the controller 61.

The playback unit 65 has a function similar to the function of the playback unit 25 in the base unit 1.

The cordless-handset user I/F 57 has operation buttons 54 provided on the cordless handset 50 and a display 53.

The wireless communication unit 69 sends and receives various types of signals 100 and 110, including audio signals, to and from the wireless communication unit 27 of the base unit 1 or the wireless communication unit of the base unit 2, 3, or 4 by wireless communication.

The measurement unit 68 measures the intensity of an electric field of signals received by the wireless communication unit 69.

The charging circuit 75 charges a battery 71 provided in the cordless handset 50 via a charging terminal 55 provided on the surface of the cordless handset 50 from the charging cradle 80.

Furthermore, the charging circuit 75 detects a charged voltage of the battery 71 and transmits the result to the controller 61.

The charging cradle 80 has a charging terminal 82 that is electrically connected to the charging terminal 55 of the cordless handset 50, and is connected to an external power supply.

In the cordless phone 10 configured as described above, each of the base units 1, 2, 3, and 4 can perform external-line communication with the external communication terminal 300 via the telephone circuit 200, and can perform internal-line communication with the cordless handset 50.

Furthermore, the base units 1, 2, 3, and 4 can mutually perform external-line communications.

Furthermore, the cordless handset 50 can perform external-line communication with the external communication terminal 300 via any one of the base units 1, 2, 3, and 4 and the telephone circuit 200.

FIG. 1 has been described using a direct wireless connection between the cordless handset 50 and the base units 1, 2, 3, and 4. Alternatively, cordless handset 50 may be connected to one or more of base units 1, 2, 3, and 4 using an indirect connection. For instance, cordless handset 50 may use a bridge connection where another device acts as a wireless bridge between the cordless handset 50 and one or more of the base units 1, 2, 3, and/or 4.

Next, flows of processes executed in the cordless phone 10 according to the first embodiment will be described with reference to FIGS. 2 to 9.

Figure 2:
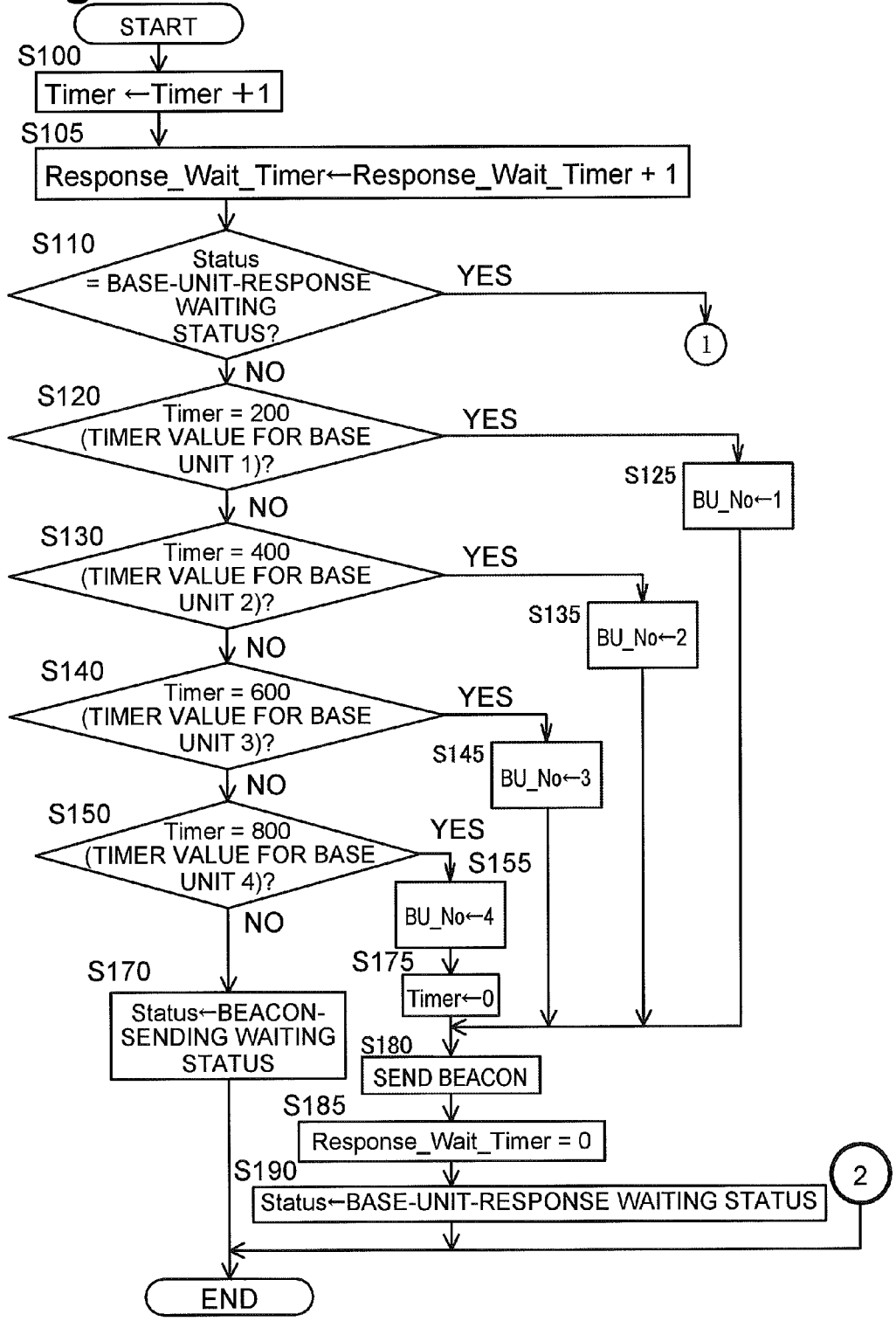
FIG. 2 is a flowchart showing a timer interrupt process in which the status of connection between base units and a cordless handset is monitored according to the first embodiment.
Figure 3:
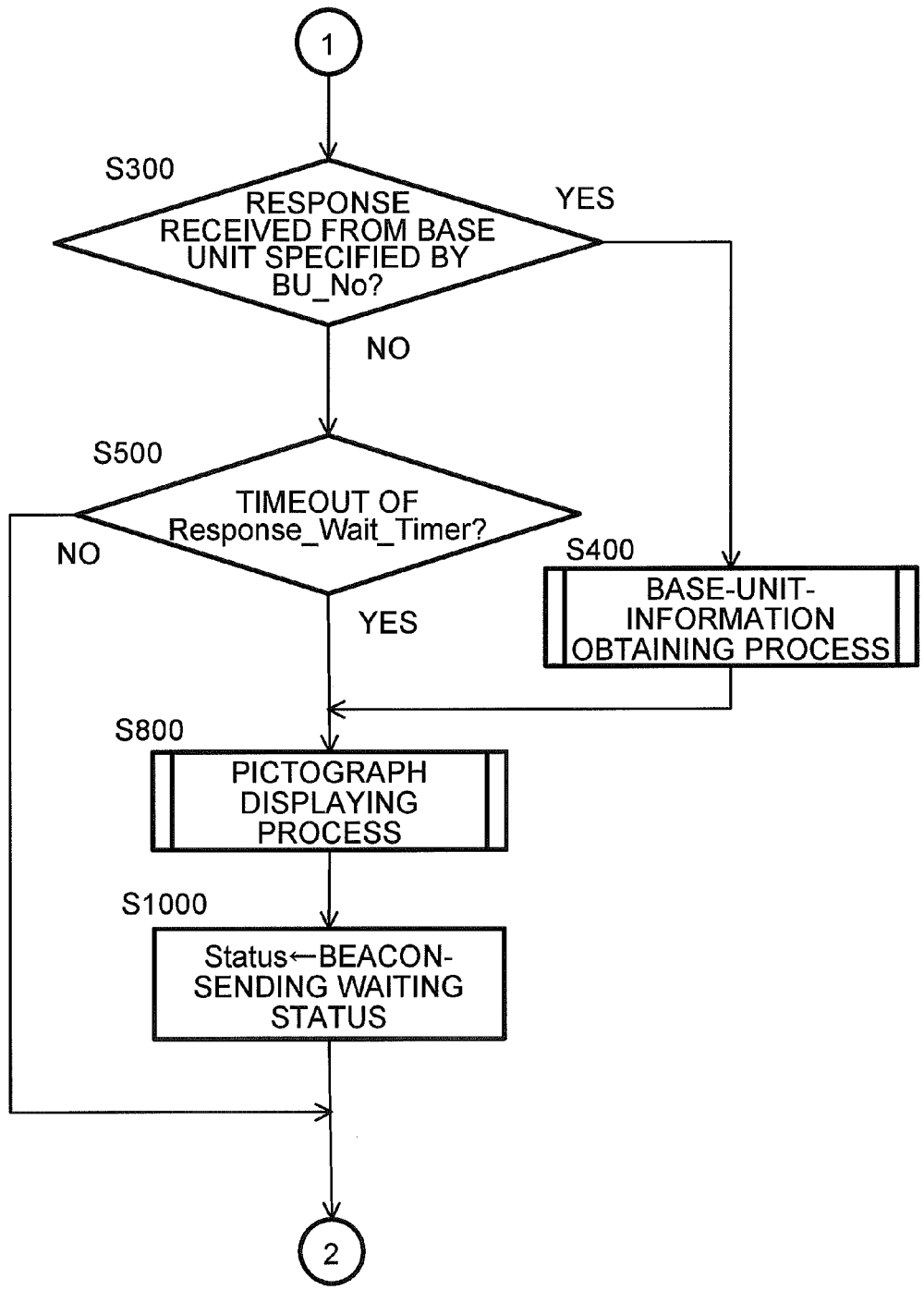
FIG. 3 is a flowchart showing the timer interrupt process in which the status of connection between base units and a cordless handset is monitored according to the first embodiment.

FIGS. 2 and 3 are flowcharts of a timer interrupt process in which the status of connection between base units and a cordless handset is monitored in the first embodiment.

The timer interrupt process shown in FIGS. 2 and 3 is executed repeatedly at predetermined time intervals (at intervals of 1 msec in the first embodiment). This process may be started or stopped according to instructions input using the operation buttons 54.

This allows monitoring the status of connection between base units and a cordless handset only during a specified period.

For the convenience of description, it is assumed in the following description that the variables described below have the following values: timer value for base unit 1=200, timer value for base unit 2=400, timer value for base unit 3=600, and timer value for base unit 4=800.

Furthermore, it is assumed in the following description that a variable Timer, a variable Status, a variable Counter, a variable Command, a variable Work, a variable Color, a variable Response_Wait_Timer, a variable AD_PORT, and a base-unit-number memory are all allocated to the RAM 61b of the cordless handset 50.

In the timer interrupt process, the CPU 61a first increments the value of the timer variable Timer for monitoring base units by 1 (S100).

The variable Timer is a variable for counting the number of times of execution of the timer interrupt process.

The variable Timer is initialized to 0 when the cordless phone 10 is powered on, and is incremented by 1 each time the timer interrupt process is executed.

In the first embodiment, the timer interrupt process is executed every 1 msec, so that an increment of the value of the variable Timer by 1 corresponds to elapse of 1 msec.

The intervals of 1 msec of the timer interrupt process is counted by the timer 61e.

Then, the CPU 61*a* increments the value of the variable Response_Wait_Timer by 1 (S105).

The variable Response_Wait_Timer is a variable for measuring a time elapsed since the cordless handset 50 has generated a beacon as will be described later, and is reset to 0 each time a beacon is sent.

Then, the CPU 61*a* checks whether the variable Status indicates a base-unit-response waiting status (S110).

The variable Status indicates a status of a cordless handset, and takes on one of two values, namely, a base-unit-response waiting status or a beacon-sending waiting status.

The initial value of the variable Status is the "beacon-sending waiting status".

If the value of variable Status is not the base-unit-response waiting status, if the value of the variable Status is the beacon-sending waiting status (No in S110), the CPU 61*a* checks whether the value of the variable Timer is the timer value for the base unit 1=200 (S120).

The timer value for the base unit 1, the timer value for the base unit 2, the timer value for the base unit 3, and the timer value for the base unit 4 each refers to a timer value corresponding to timing for sending a beacon to the relevant base unit.

For example, when the value of the timer variable Timer has become the timer value for the base unit 1=200, the cordless handset 50 sends a beacon to the base unit 1. Similarly, when the value of the timer variable Timer has become the timer value for the base unit 2=400, the cordless handset 50 sends a beacon to the base unit 2.

If the value of the variable Status is the base-unit-response waiting status (YES in S110), a process shown in FIG. 3 is executed.

When the value of the variable Timer is the timer value for the base unit 1=200 (YES in S120), the CPU 61*a* stores "1" in the base-unit-number memory (BU_No, hereinafter simply referred to as the base-unit-number memory) (S125).

On the other hand, if the value of the variable Timer is not the timer value for the base unit 1=200 (No in S120), the CPU 61*a* checks whether the value of the variable Timer is the timer value for the base unit 2=400 (S130).

If the value of the variable Timer is the timer value for the base unit 2=400 (YES in S130), the CPU 61*a* stores "2" in the base-unit-number memory (S135).

On the other hand, if the value of the variable Timer is not the timer value for the base unit 2=400 (No in S130), the CPU 61*a* checks whether the value of the variable Timer is the timer value for the base unit 3=600 (S140).

If the value of the variable Timer is the timer value for the base unit 3=600 (Yes in S140), the CPU 61*a* stores "3" in the base-unit-number memory (S145).

On the other hand, if the value of the variable Timer is not the timer value for the base unit 3=600 (No in S140), the CPU 61*a* checks whether the value of the variable Timer is the timer value for the base unit 4=800 (S150).

If the value of the variable Timer is not the timer value for the base unit 4=800 (No in S150), the process proceeds to step S170.

In this case, it is indicated that the value of the variable Timer coincides with none of the timer values for the base units 1 to 4.

This is equivalent to not sending a beacon in the timer interrupt process.

Thus, the CPU 61*a* sets the variable Status to the beacon-sending waiting status (S170), and exits the timer interrupt process.

On the other hand, if the value of the variable Timer is the timer value for the base unit 4=800 (YES in S150), the CPU 61*a* stores "4" in the base-unit-number memory (S155), and sets the variable Timer to 0 (S175).

According to the number "1", "2", "3", or "4" stored in the base-unit-number memory in step S125, S135, S145, or S155, the CPU 61*a* sends a beacon to the corresponding base unit (S180), and resets the variable Response_Wait_Timer to 0 (S185).

For example, if "1" is stored in the base-unit-number memory, the CPU 61*a* sends a beacon to the base unit 1.

The beacon refers to packets that are sent at constant intervals for the purpose of synchronization of wireless communication.

In the first embodiment, the beacon is sent to the base units 1, 2, 3, and 4 in that order, and information regarding the base units 1, 2, 3, and 4 is obtained from signals returned from the base units 1, 2, 3, and 4 to the cordless handset 50.

Upon sending the beacon, the cordless handset 50 enters a status of waiting for a response from the base unit 1, 2, 3, or 4.

Thus, the CPU 61*a* changes the value of the variable Status to the base-unit-response waiting status (S190).

Then, the CPU 61*a* exits the timer interrupt process.

Next, description will be given with reference to FIG. 3.

FIG. 3 shows the procedure of a process that is executed when the value of the variable Status is the base-unit-response waiting status in step S110 shown in FIG. 2.

The following description will be given assuming that the base unit specified in the base-unit-number memory is the base unit 1 and a beacon has been sent from the cordless handset 50 to the base unit 1.

In the procedure of the process shown in FIG. 3, first, the CPU 61*a* checks whether a response has been received from the base unit 1, specified in the base-unit-number memory (S300).

If no response has been received from the base unit 1 (NO in S300), the CPU 61*a* checks whether a timeout of the variable Response_Wait_Timer has occurred (S500).

The timeout refers to a situation where the value of the variable Response_Wait_Timer exceeds a predetermined time (150 msec in the first embodiment).

If it is determined that a timeout has not occurred (NO in S500), the CPU 61*a* exits the interrupt process.

If a response from the base unit 1 has been received (YES in S300), the CPU 61*a* obtains information of the base unit 1 (S400). This step will be described later in detail.

If a timeout of the variable Response_Wait_Timer has occurred (YES in S500), or if information of the base unit 1 has been obtained (S400), the CPU 61*a* displays a pictograph on the display 53 of the cordless handset 50 (S800). This step will be described later in detail.

After the pictograph is displayed, the CPU 61*a* changes the value of the variable Status to the beacon-sending waiting status (S1000), and then the CPU 61*a* exits the interrupt process.

Through the process described above, the cordless handset 50 sends beacons to the base units 1, 2, 3, and 4 in that order, and each base unit located within a communication range returns a command to the cordless handset 50.

Then, information as to whether each of the base units 1, 2, 3, and 4 is in a waiting status is obtained using commands.

Then, the information that has been obtained is displayed on the display 53 of the cordless handset 50. This will be described later in detail.

Next, a "base-unit-information obtaining process" in step S400 and a "pictograph displaying process" in step S800 shown in FIG. 3 will be described.

Figure 4:
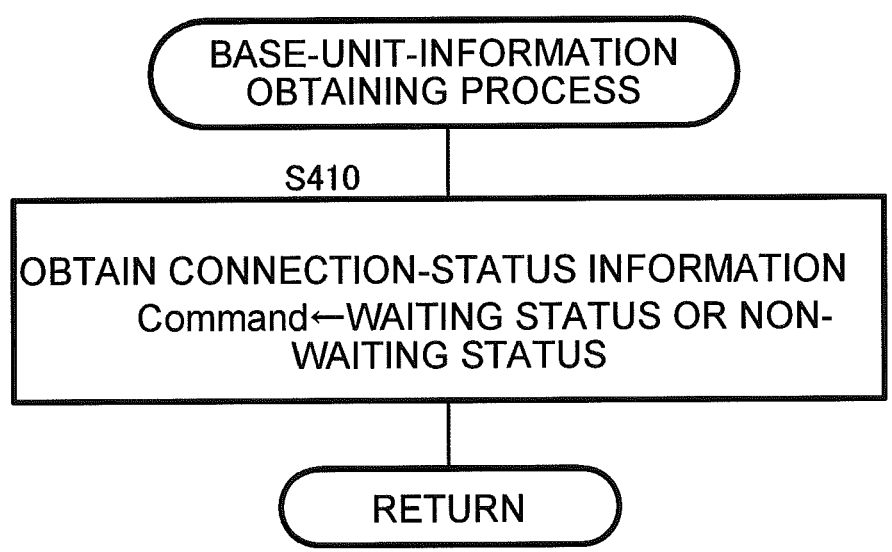
FIG. 4 is a flowchart showing a base-unit-information obtaining process according to the first embodiment.
Figure 5:
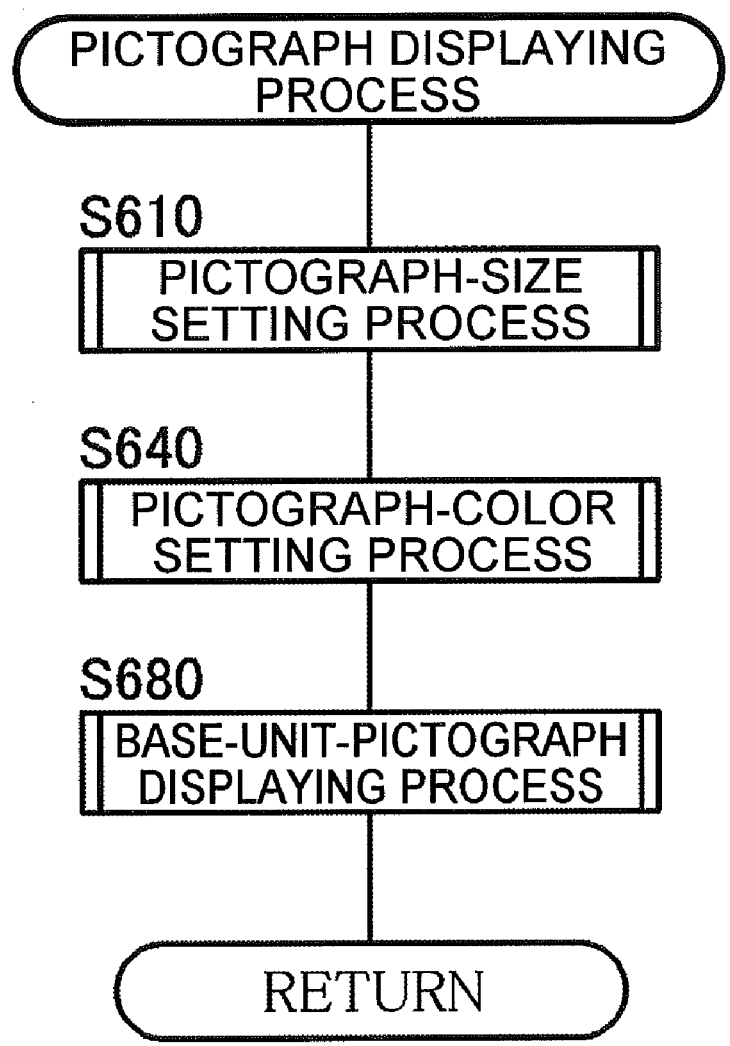
FIG. 5 is a flowchart showing a pictograph displaying process according to the first embodiment.

FIG. 4 is a flowchart showing the base-unit-information obtaining process in the first embodiment, and FIG. 5 is a flowchart showing the pictograph displaying process in the first embodiment.

In the first embodiment, information as to whether the base unit 1 is currently in a waiting status is included in a command returned from the base unit 1 specified in the base-unit-number memory.

In the base-unit-information obtaining process shown in FIG. 4, the cordless handset 50 obtains the command from the base unit 1 and stores in the variable Command the information as to whether the base unit 1 is in a waiting status or a non-waiting status (S410).

In the pictograph displaying process, the size of the pictograph is set (S610), and then the color of the pictograph is set (S640). Then, the pictograph of the specified base unit is displayed (the base unit 1 in this example) (S680).

Next, a "pictograph-size setting process" in step S610, a "pictograph-color setting process" in step S640, and a "base-unit-pictograph displaying process" in step S680 shown in FIG. 5 will be described.

Figure 6:
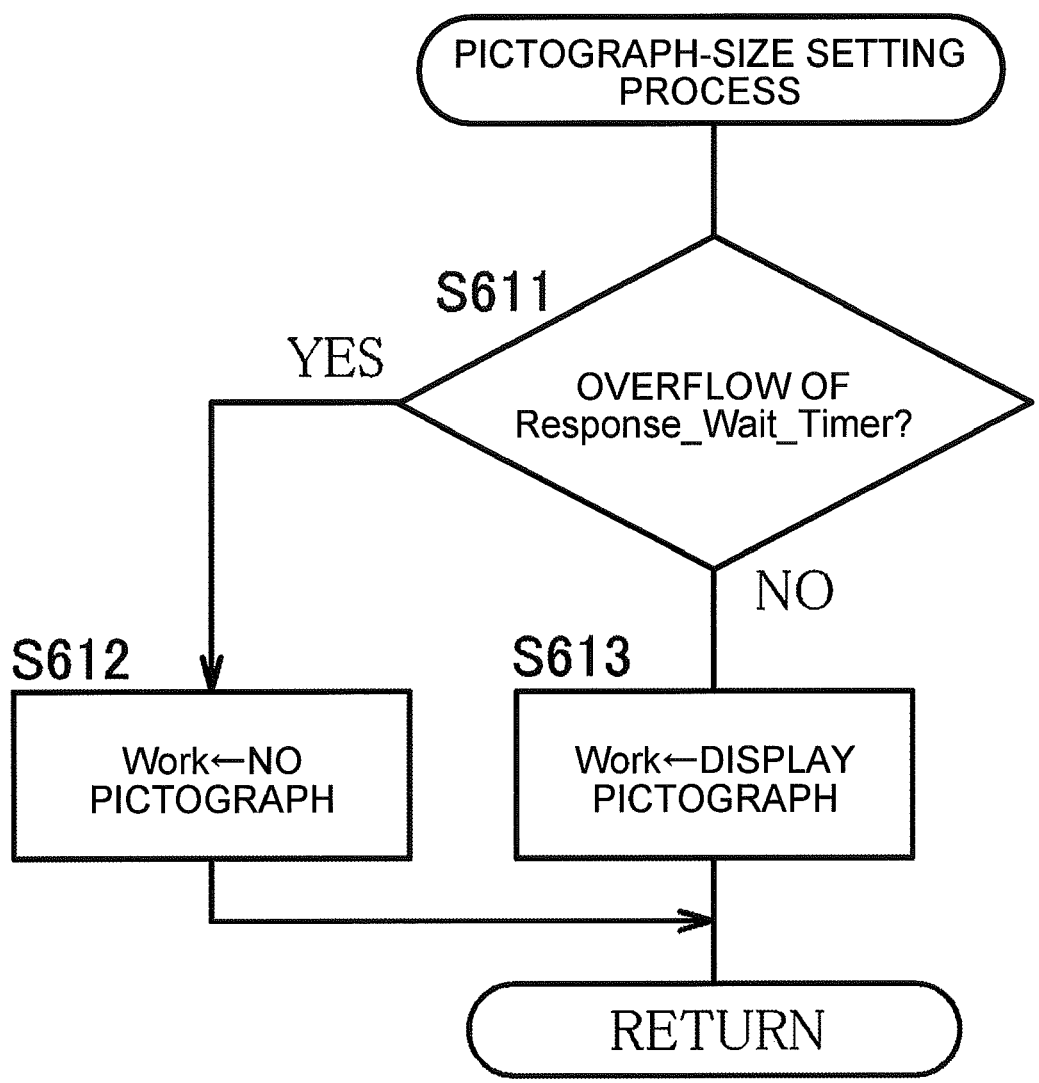
FIG. 6 is a flowchart showing a pictograph-size setting process according to the first embodiment.
Figure 7:
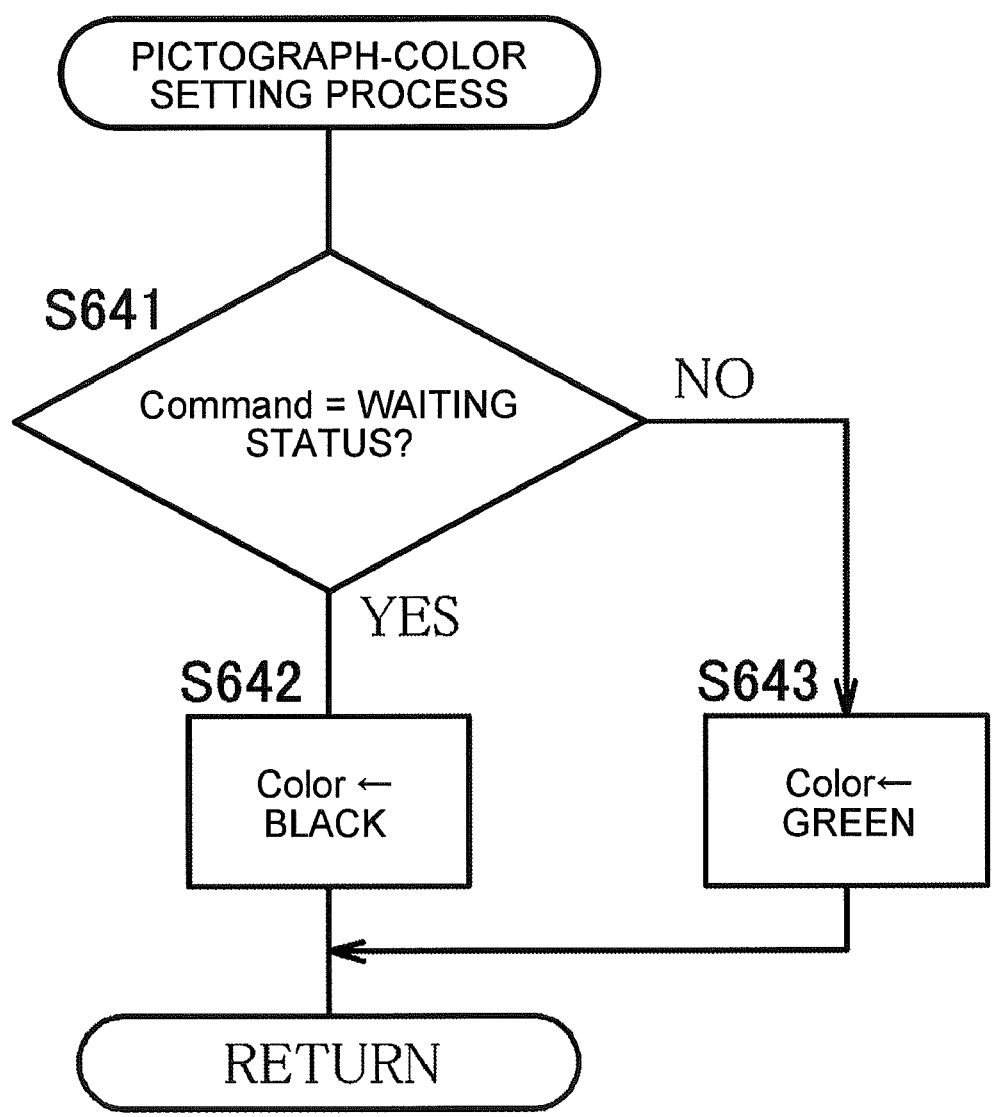
FIG. 7 is a flowchart showing a pictograph-color setting process according to the first embodiment.
Figure 8:
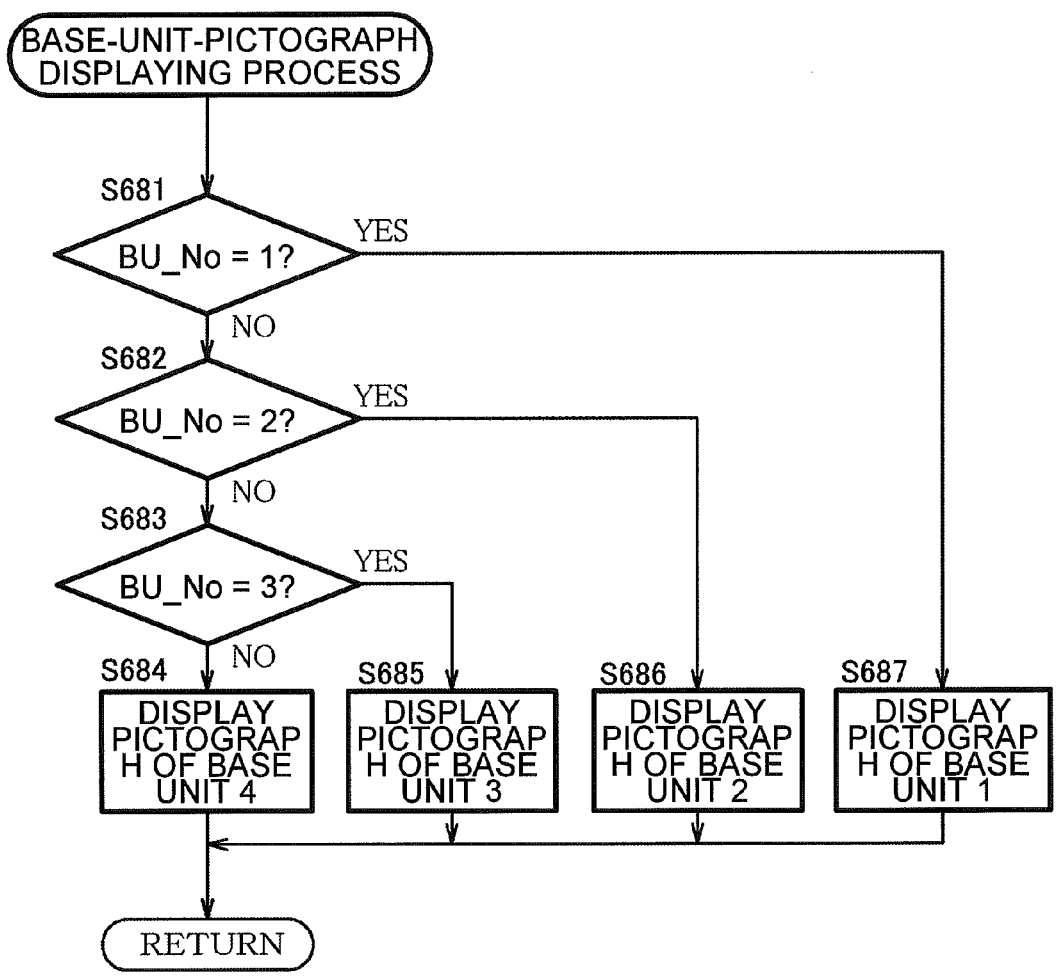
FIG. 8 is a flowchart showing a base-unit-pictograph displaying process according to in the first embodiment.

FIG. 6 is a flowchart showing the pictograph-size setting process in the first embodiment, FIG. 7 is a flowchart showing the pictograph-color setting process in the first embodiment, and FIG. 8 is a flowchart showing the base-unit-pictograph displaying process in the first embodiment.

First, the "pictograph-size setting process" in step S610 shown in FIG. 5 will be described.

In the first embodiment, in the "pictograph-size setting process", instead of setting the size of a pictograph, a pictograph is displayed when a base unit (in this example, the base unit 1 specified in the base-unit-number memory) is located within the communication range while the pictograph is not displayed when the base unit is not located within the communication range.

Referring to FIG. 6, first, the CPU 61a checks whether an overflow of the variable Response_Wait_Timer has occurred (S611).

If it is determined that an overflow of the variable Response_Wait_Timer has occurred (YES in S611), the CPU 61a sets the variable Work to "No pictograph" (S612).

If it is determined that an overflow of the variable Response_Wait_Timer has not occurred (NO in S611), the CPU 61a sets the variable Work to "Display pictograph" (S613).

Next, the "pictograph-color setting process" in step S640 shown in FIG. 5 will be described.

In the first embodiment, the "pictograph-color setting process" is a process of allowing recognition as to whether the base unit is in an waiting status by the color of a displayed pictograph.

The color of the pictograph that is set can be any color that allows recognition as to whether the base unit is in a waiting status. In the following description, it is assumed that black is used as a first color to indicate a waiting status and green is used as a second color to indicate a non-waiting status.

Referring to FIG. 7, first, the CPU 61a checks whether the value of the variable Command indicates a waiting status (S641).

If it is determined that value of the variable Command indicates a waiting status (YES in S641), the CPU 61a sets the variable Color to the first color, i.e., black (S642).

On the other hand, if it is determined that the value of the variable Command does not indicate a waiting status (NO in S641), the CPU 61a sets the variable Color to the second color, i.e., green (S643). The variable Color represents the color of a pictograph displayed on the display 53 of the cordless handset 50.

Next, the "base-unit-pictograph displaying process" in step S680 shown in FIG. 5 will be described.

Referring to FIG. 8, first, the CPU 61a checks whether the value in the base-unit-number memory is "1" (S681).

If the value in the base-unit-number memory is "1" (YES in S681), according to the content of the variable Work (a pictograph is displayed if the content of the variable Work is "Display pictograph" while no pictograph is displayed if the content of the variable Work is "No pictograph"), the CPU 61a displays a pictograph of the base unit 1 on the display 53 of the cordless handset 50 in the color specified by the variable Color (S687).

On the other hand, if the value in the base-unit-number memory is not "1" (NO in S681), the CPU 61a checks whether the value in the base-unit-number memory is "2" (S682).

If the value in the base-unit-number memory is "2" (YES in S682), according to the content of the variable Work, the CPU 61a displays a pictograph of the base unit 2 on the display 53 of the cordless handset 50 in the color specified by the variable Color (S686).

On the other hand, if the value in the base-unit-number memory is not "2" (NO in S682), the CPU 61a checks whether the value in the base-unit-number memory is "3" (S683).

If the value in the base-unit-number memory is "3", according to the content of the variable Work, the CPU 61a displays a pictograph of the base unit 3 on the display 53 of the cordless handset 50 in the color specified by the variable Color (S685).

On the other hand, if the value in the base-unit-number memory is not "3" (NO in S683), according to the content of the variable Work, the CPU 61a displays a pictograph of the base unit 4 on the display 53 of the cordless handset 50 in the color specified by the variable Color (S684).

Figure 9:
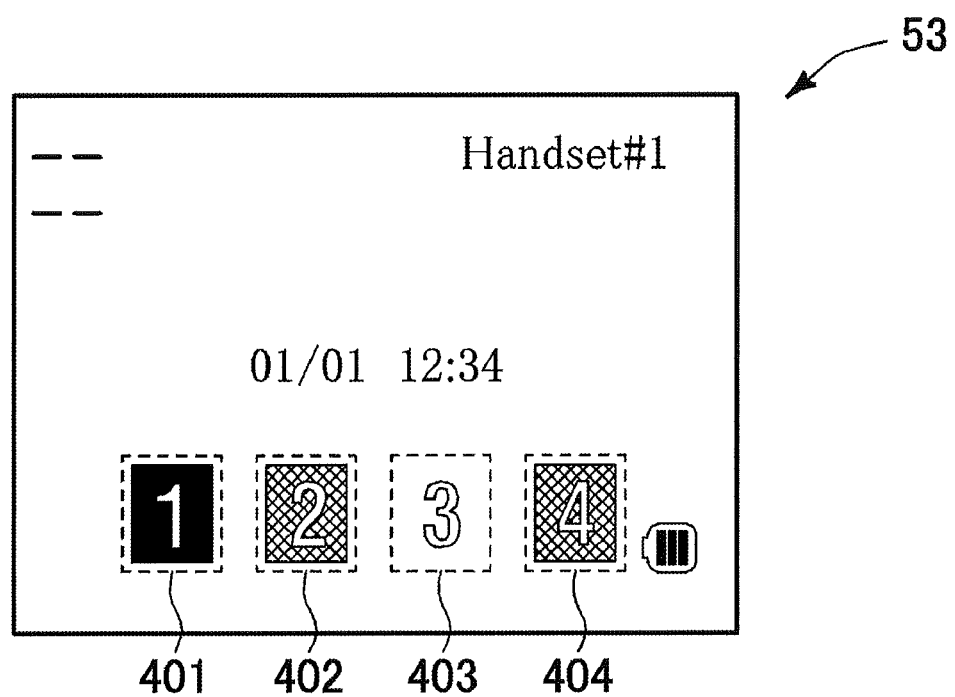
FIG. 9 is an illustration showing a status of display on a display of the cordless handset according to the first embodiment.

FIG. 9 is an illustration showing an example of the status of display on the display 53 of the cordless handset 50 in the first embodiment, in which connection-status information of the base units 1, 2, 3, and 4 is displayed.

On the display 53, rectangular display areas 401, 402, 403, and 404 individually corresponding to the base units 1, 2, 3, and 4 are provided, in which numbers 1, 2, 3, and 4 representing the individual base units are displayed. It is appreciated that one or more of the display areas 401-404 may be defined by other shapes including but not limited to triangles, circles, pentagons, and the like.

If a pictograph is displayed in the rectangular display area 401, 402, 403, or 404, it is indicated that the corresponding base unit is located within the communication range of the cordless handset 50. If no pictograph is displayed in the rectangular display area 401, 402, 403, or 404, it is indicated that the corresponding base unit is not located within the communication range of the cordless handset 50.

Furthermore, if the color of a pictograph in the display area 401, 402, 403, or 404 is black, it is indicated that the corresponding base unit is in a waiting status. If the color of a pictograph in the display area 401, 402, 403, or 404 is green, it is indicated that the corresponding base unit is in a non-waiting status.

In the example shown in FIG. 9, the base unit 1 is located within the communication range and is in a waiting status, the base units 2 and 4 are located within the communication range and are in a non-waiting status, and the base unit 3 is not located within the communication range.

The status display on display 53 of FIG. 9 may reflect a direct wireless connection between cordless handset 50 and each of base units 1-4. Alternatively, the display on display 53 of FIG. 9 may reflect an indirect wireless connection between cordless handset 50 and each of base units 1-4 (for instance, using one or more devices as a wireless bridge). Further, the display on display 53 of FIG. 9 may reflect a combination of representations of direct and/or indirect wireless connections between cordless handset 50 and each of base units 1-4. For instance, a stronger of a direct or indirect signal from any given base unit 1-4 may be represented on display 53.

Second Embodiment

Next, a second embodiment of the present invention will be described.

In the first embodiment, instead of setting the size of a pictograph, a pictograph is displayed when a base unit is located within the communication range while no pictograph is displayed when a base unit is not located within the communication range.

In the second embodiment, for each of the base units 1, 2, 3, and 4, status information is displayed on the display 53 of the cordless handset 50. The status information indicates one of the following three statuses: the base unit is in a waiting status; the base unit is making an internal-line call with a cordless handset; and the base unit is making an external-line call with an external communication terminal via a telephone circuit.

Description of features common to the first embodiment will be omitted.

In the second embodiment, information indicating the status of each of the base units 1, 2, 3, and 4 among three statuses is displayed on the display 53 using different colors for the individual statuses for the purpose of distinction. The three statuses are as follows: the base unit is in a waiting status; the base unit is making an internal-line call with a cordless handset; and the base unit is making an external-line call with an external communication terminal via a telephone circuit.

In the second embodiment, black is used as a first color to indicate the waiting status, red is used as a second color to indicate the internal-line-call status, and blue is used as a third color to indicate the external-line-call status.

Figure 10:
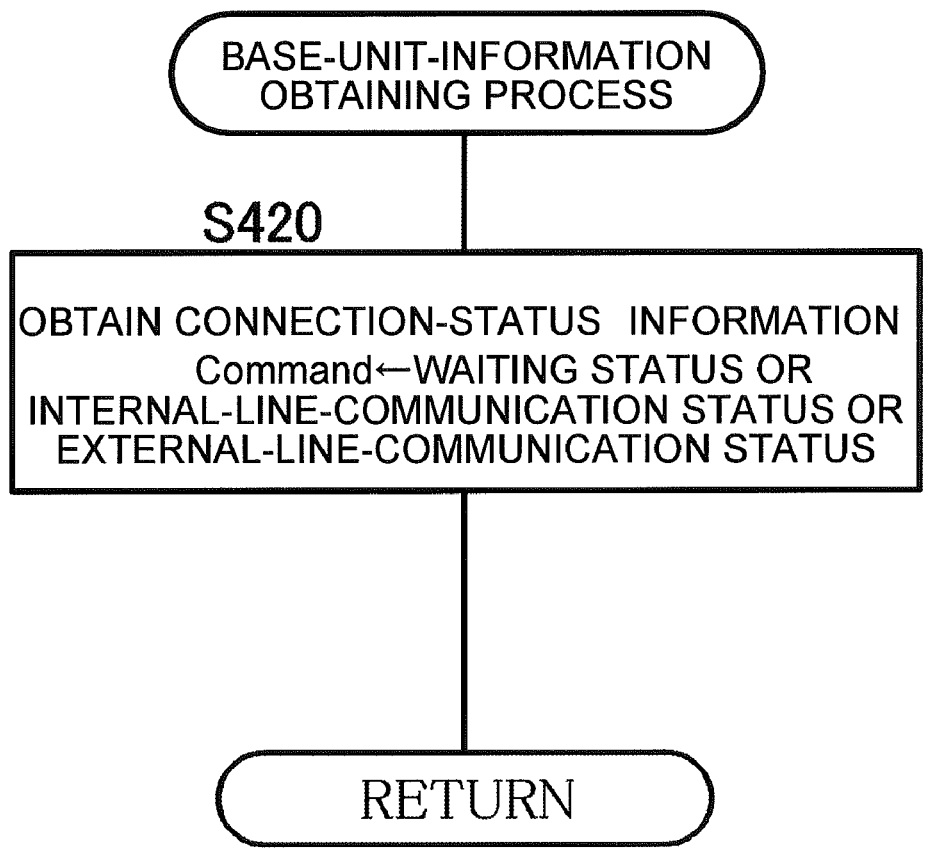
FIG. 10 is a flowchart showing a base-unit-information obtaining process according to a second embodiment.
Figure 11:
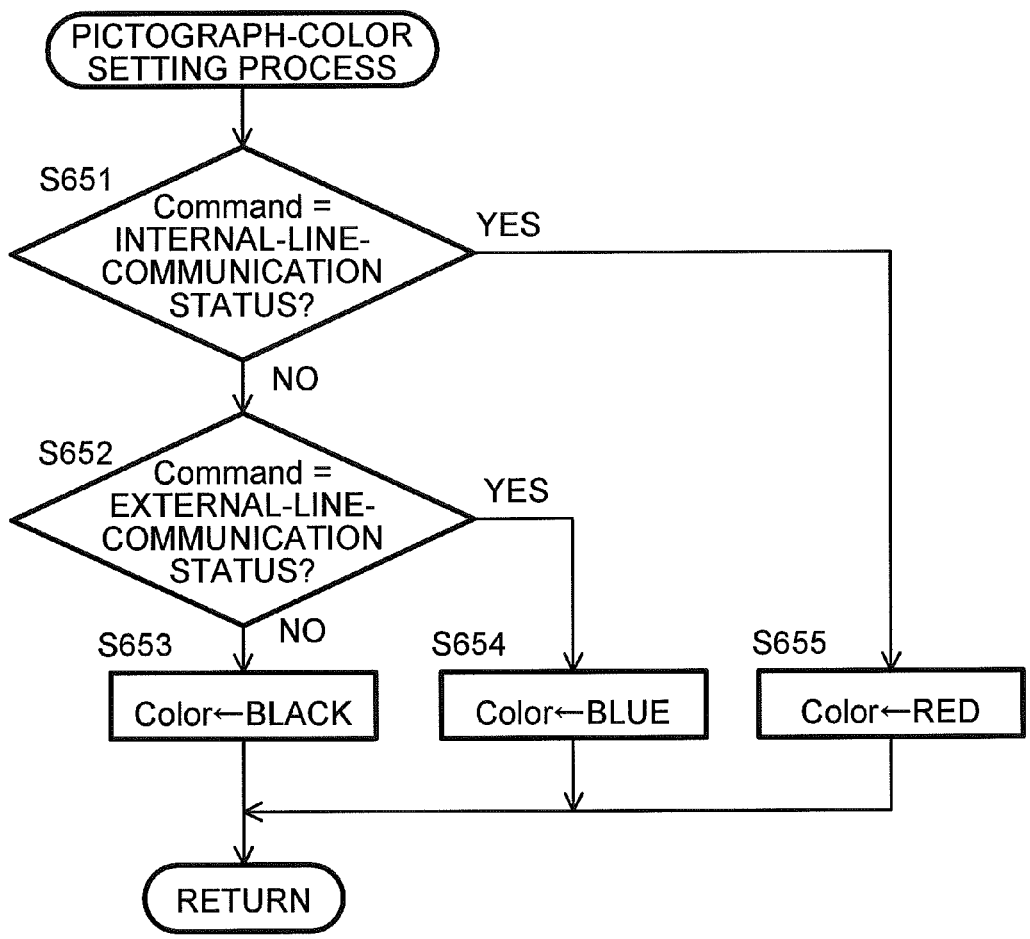
FIG. 11 is a flowchart showing a pictograph-color setting process according to the second embodiment.
Figure 12:
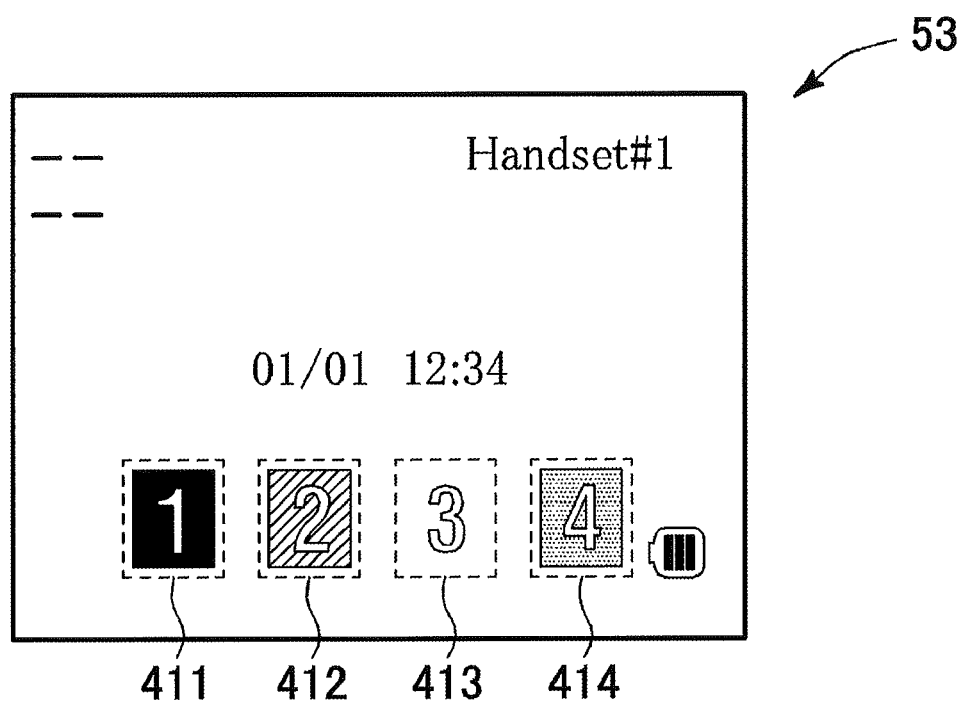
FIG. 12 is an illustration showing a status of display on a display of a cordless handset according to the second embodiment.

FIG. 10 is a flowchart showing a base-unit-information obtaining process in the second embodiment, FIG. 11 is a flowchart showing a pictograph-color setting process in the second embodiment, and FIG. 12 is an illustration showing a status of display on the cordless handset 50 in the second embodiment.

FIG. 10 corresponds to step S400 (base-unit-information obtaining process) in the first embodiment, shown in FIG. 3.

In the base-unit-information obtaining process shown in FIG. 10, the cordless handset 50 obtains commands from the base units 1, 2, 3, and 4, and stores in the variable Command information regarding the status of each of the base units 1, 2, 3, 4, indicating the waiting status, the internal-line-call status, or the external-line-call status (S420).

FIG. 11 corresponds to step S640 (pictograph-color setting process) in the first embodiment, shown in FIG. 5.

Referring to FIG. 11, first, the CPU 61a checks whether the value of the variable Command indicates the internal-line-call status (S651).

If the value of the variable Command indicates the internal-line-call status (YES in S651), the CPU 61a sets the variable Color to red (S655).

On the other hand, if the value of the variable Command does not indicate the internal-line-call status (NO in S651), the CPU 61a checks whether the value of the Variable Command indicates the external-line-call status (S652).

If the value of the variable Command indicates the external-line-call status (YES in S652), the CPU 61a sets the variable Color to blue (S654).

On the other hand, if the value of the variable Command does not indicate the external-line-call status (NO in S652), the CPU 61a determines that the base unit is in the waiting status and sets the variable Color to black (S653).

Referring to FIG. 12, if a pictograph is displayed in a rectangular display area 411, 412, 413, or 414, it is indicated that the corresponding base unit 1, 2, 3, or 4 is located within the communication range of the cordless handset 50. On the other hand, if no pictograph is displayed in the rectangular display area 411, 412, 413, or 414, it is indicated that the corresponding base unit 1, 2, 3, or 4 is not located within the communication range of the cordless handset 50. It is appreciated that one or more of the display areas 411-414 may defined by other shapes including but not limited to triangles, circles, pentagons, and the like.

Furthermore, if the color of a pictograph in the display area 411, 412, 413, or 414 is the first color, i.e., black, it is indicated that the corresponding base unit 1, 2, 3, or 4 is in the waiting status. If the color is the second color, i.e., red, it is indicated that the corresponding base unit 1, 2, 3, or 4 is in the internal-line-call status. If the color is the third color, i.e., blue, it is indicated that the corresponding base unit 1, 2, 3, or 4 is in the external-line-call status.

In the example shown in FIG. 12, the base unit 1 is located within the communication range and is in the waiting status, the base unit 2 is located within the communication range and is in the internal-line-call status, the base unit 3 is not located within the communication range, and the base unit 4 is located within the communication range and is in the external-line-call status.

Third Embodiment

Next, a third embodiment of the present invention will be described.

In the third embodiment, in addition to the features of the first and second embodiments, the intensity of an electric field generated by radio waves between each of the base units 1, 2, 3, and 4 and the cordless handset 50 is detected, and is displayed together with the connection status.

Description of features of the third embodiment common to those of the first and second embodiments will be omitted.

Figure 13:
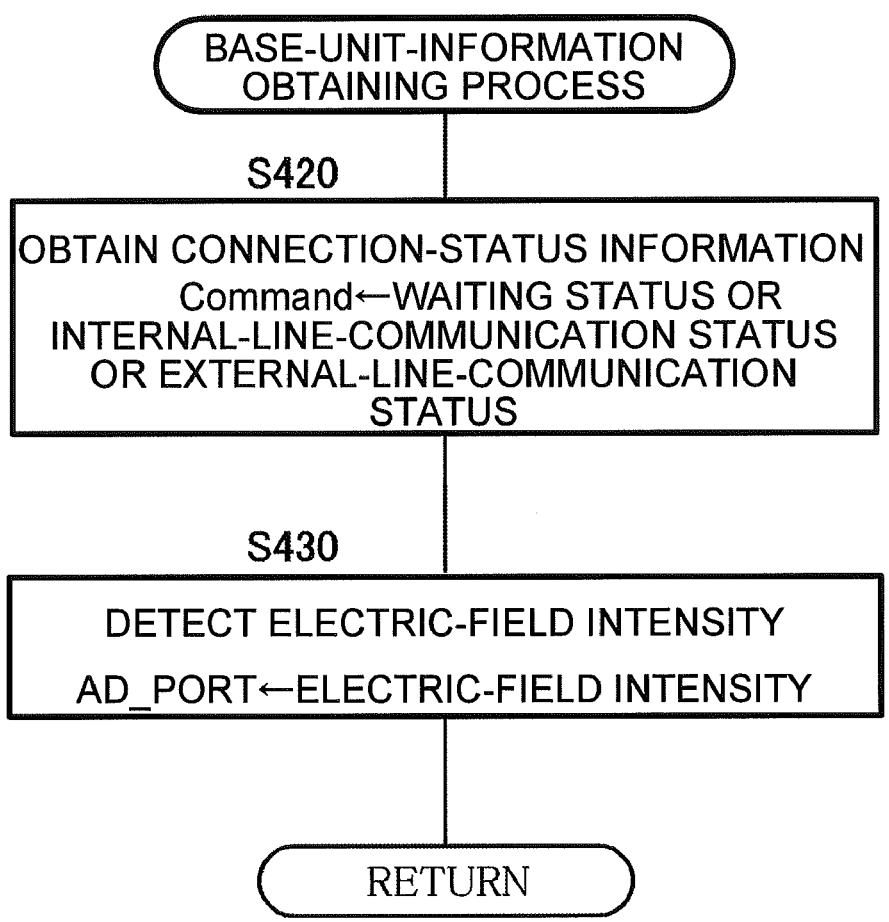
FIG. 13 is a flowchart showing a base-unit-information obtaining process according to a third embodiment.
Figure 14:
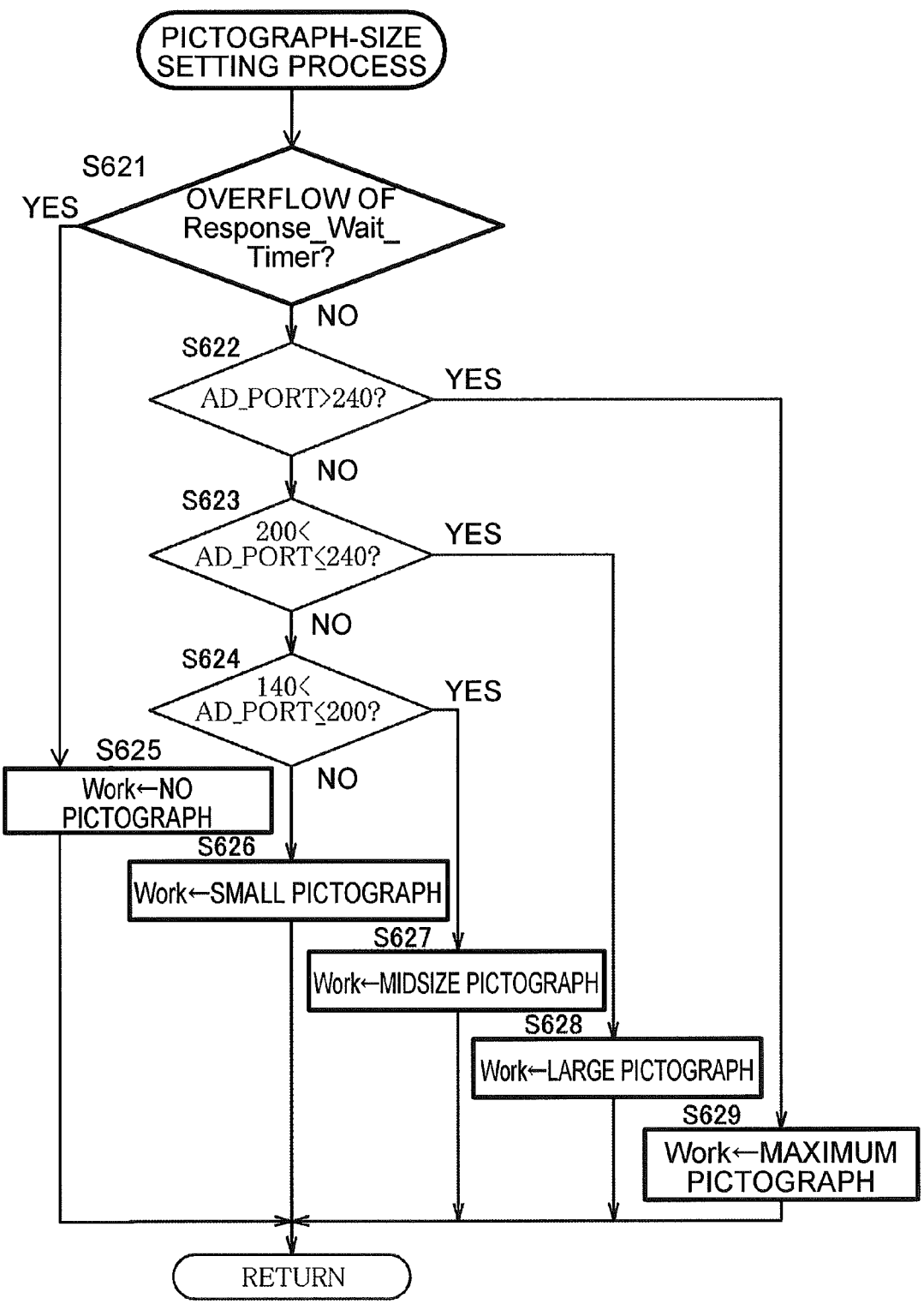
FIG. 14 is a flowchart showing a pictograph-size setting process according to the third embodiment.
Figure 15:
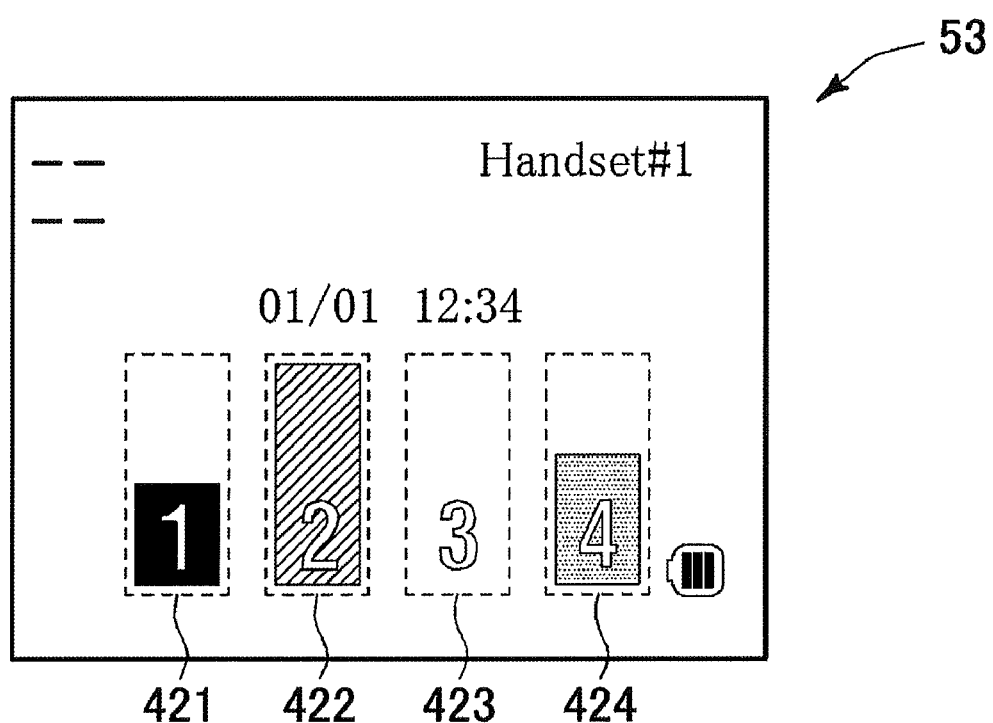
FIG. 15 is an illustration showing a status of display on a display of a cordless handset according to the third embodiment.

FIG. 13 is a flowchart showing a base-unit-information obtaining process in the third embodiment, FIG. 14 is a flowchart showing a pictograph-size setting process in the third embodiment, and FIG. 15 is an illustration showing a status of display on the display of the cordless handset in the third embodiment.

Referring to FIG. 13, first, a connection-status-information obtaining process is executed.

More specifically, the cordless handset 50 obtains commands from the base units 1, 2, 3, and 4, and stores in the variable Command information regarding the status of each of the base units 1, 2, 3, and 4, indicating the waiting status, the internal-line-call status, or the external-line-call status (S420).

The connection-status-information obtaining process described above may be replaced by the connection-status-information obtaining process in step S410 shown in FIG. 4. In that case, step S420 shown in FIG. 13 is omitted.

In the case where step S420 is omitted, only the electric-field intensities are displayed on the display 53 of the cordless handset 50.

Then, electric-field intensities are detected (S430).

In this step, electric-field intensities are detected using the measurement unit 68 from reception signals 110 obtained in step S420, and the corresponding values are stored in the variable AD_PORT.

FIG. 14 shows a process of switching the sizes of pictographs displayed on the display 53 according to the magnitudes of the detected electric-field intensities.

The number of possible sizes of pictographs can be determined to be any number as appropriate. For convenience of description, the third embodiment will be described in the context of an example where switching among three sizes is allowed.

For the purpose of the switching among three sizes, 140 is used as a first threshold, 200 is used as a second threshold, and 240 is used as a third threshold.

Referring to FIG. 14, first, the CPU 61a checks whether an overflow of the variable Response_Wait_Timer has occurred (S621).

If an overflow of the variable Response_Wait_Timer has occurred (YES in S621), the CPU 61a considers that the base unit is not located within the communication range and thus sets the variable Work to "No pictograph") (S625).

In the third embodiment, the variable Work is used to indicate a pictograph size as well as whether a pictograph is to be displayed.

In the following description, the variable Work takes on one of a number of values. The number of values may range from three to any desired number of values. For instance, the following description sets the variable Work to be equal to five values, namely, "No pictograph" (no pictograph is displayed), "Small pictograph" (a small pictograph is displayed), "Midsize pictograph" (a midsize pictograph is displayed), "Large pictograph" (a large pictograph is displayed), and a "Maximum pictograph" (a maximum-size pictograph is displayed). The values may be expressed as a variation in size of the pictograph including but not limited to a variation in a length, a width, an area occupied, and the like.

If an overflow of the variable Response_Wait_Timer has not occurred (NO in S621), the CPU 61a checks whether the value of the variable AD_PORT is greater than 240 (S622).

If the value of the variable AD_PORT is greater than 240 (YES in S622), the CPU 61a sets the variable Work to "Maximum pictograph" (S629).

On the other hand, if the value of the variable AD_PORT is not greater than 240 (NO in S622), the CPU 61a checks whether the value of the variable AD_PORT is greater than 200 and is less than or equal to 240 (S623).

If the value of the variable AD_PORT is greater than 200 and is less than or equal to 240 (YES in S623), the CPU 61a sets the variable Work to "Large pictograph" (S628).

On the other hand, if the value of the variable AD_PORT does not satisfy the condition of being greater than 200 and being less than or equal to 240 (NO in S623), the CPU 61a checks whether the value of the variable AD_PORT is greater than 140 and is less than or equal to 200 (S624).

If the value of the variable AD_PORT is greater than 140 and is less than or equal to 200 (YES in S624), the CPU 61a sets the variable Work to "Midsize pictograph" (S627).

On the other hand, if the value of the AD_PORT does not satisfy the condition of being greater than 140 and being less than or equal to 200 (NO in S624), the CPU 61a sets the variable Work to "Small pictograph" (S626).

In the example shown in FIG. 15, display areas 421, 422, 423, and 424 individually corresponding to the base units 1, 2, 3, and 4 are provided, and a small-size pictograph of the base unit 1, a maximum-size pictograph of the base unit 2, no pictograph of the base unit 3, and a midsize pictograph of the base unit 4 are displayed. It is appreciated that one or more of the display areas 421-424 may defined by other shapes including but not limited to triangles, circles, pentagons, and the like.

Thus, it can be recognized at a glance that the condition of radio waves is best with the base unit 2, and becomes inferior in order of 4, 1, and 3.

Furthermore, in the example shown in FIG. 15, similarly to FIG. 12, the pictograph of the base unit 1 is displayed in black, the pictograph of the base unit 2 is displayed in red, and the pictograph of the base unit 4 is displayed in blue.

This indicates that the base unit 1 is in the waiting status, the base unit 2 is in the internal-line-call status, and the base unit 4 is in the external-line-call status.

Various Alternatives To Embodiments

The display areas 401, 402, 403, 404, 411, 412, 413, 414, 421, 422, 423, and 424 corresponding to individual base units in the first, second, and third embodiments described above have been described as rectangular display areas for the purpose of explanation. The display areas identified above may be generally described as predefined shapes where the predefined shapes may take the form of rectangles, triangles, pentagons, hexagons, and other shapes.

Alternatively, the display areas may have circular or elliptic shapes.

Furthermore, although pictograph colors are used for distinction of connection statuses in the first to third embodiments described above, alternatively, connection statuses, e.g., the waiting status or non-waiting status, or the waiting status, internal-line-call status, or external-line-call status, may be distinguished on the basis of whether pictographs are flashing, lighted on (not flashing), or not lighted on, or by varying the intervals of flashing of pictographs.

For example, it is possible to indicate the waiting status by a pictograph that is lighted on and is not flashing and to indicate the non-waiting status by a flashing pictograph.

As another example, it is possible to indicate the internal-line-call status and the external-line-call status by different flashing intervals.

FIG. 16 is a diagram showing exchange of signals between base units and a cordless handset.

In FIG. 16, the vertical axis represents time, and the cordless handset 50 sends beacons 100 to the base units 1, 2, 3, and 4, and again 1, in that order at constant intervals A (A=200 msec in the first embodiment).

In response to the beacons, the base units 1, 2, 3, and 4 individually return response signals 110.

After the cordless handset 50 receives the response signals 110, connection-status information and electric-field intensities of the base units 1, 2, 3, and 4 are displayed on the display 53 of the cordless handset 50.

If the cordless handset 50 does not receive a response signal 110 from the base unit 3 during a predetermined period B (B=150 msec in the first embodiment), for example, in the case of the base unit 3 in FIG. 16, it is determined that the base unit 3 is not located within the communication range.

Various embodiments have been described above with respect to the cordless handset 50 transmitting beacons and receiving responses from base units 1-4. Alternatively, the cordless handset 50 may not transmit beacons to the base units 1-4, but the base units 1-4 being configured to wirelessly transmit on a regular basis their status to all cordless handsets 50 within range of the given base unit 1-4. In this alternative approach, the cordless handset 50 is relieved from generating beacons. Further, the cordless handset 50 may use beacons to initially register with a plurality of base units 1-4. Once registered, the cordless handset 50 may then receive status information from the registered base units 1-4 without the use of beacons. This latter approach minimizes the statuses sent from base units 1-4 to which no cordless handset 50 is registered.

Steps S410 and S420 correspond to functions of connection-status-information obtaining means in the present invention.

Furthermore, steps S684, S685, S686, and S687 correspond to functions of display controlling means in the present invention.

Furthermore, step S430 corresponds to a function of electric-field intensity detecting means in the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

What is claimed is:

1. A communication system comprising:
a plurality of base units disposed within a physical location, wherein each of the plurality of base units is configured to provide, for a cordless handset, a telecommunication connection to one or more communication devices external to the physical location; and
the cordless handset, wherein the cordless handset is configured to communicate wirelessly with each of the plurality of base units,
wherein the cordless handset includes:
display means for displaying information;
connection-status-information obtaining means for obtaining connection-status information from at least one of the plurality of base units, the connection-status information indicating whether a corresponding base unit is performing communication; and
display controlling means for controlling the display means to display the connection-status information obtained by the connection-status-information obtaining means, wherein displaying the connection-status information includes displaying the connection-status information of the corresponding base unit along with an identifier of the corresponding base unit, wherein the identifier is unique among the plurality of base units,
wherein the connection-status-information obtaining means is configured to obtain information including:
a waiting status indicating that the base unit is not performing communication with any other cordless handset and that the base unit is not performing communication with any external telecommunication circuit,
information indicating an internal-line-communication status, wherein the internal-line-communication status specifies that the base unit is only performing communication with another cordless handset, and
information indicating an external-line-communication status, wherein the external-line-communication status specifies that the base unit is performing external-line communication with an external telecommunication circuit, and
wherein the display controlling means is configured to display information on the display means in such a manner that the waiting status, the internal-line-communication status, and the external-line-communication status are visually distinguishable from each other.

2. The communication system according to claim 1, wherein the external-line-communication status includes both
a) the status of the base unit communicating with the other cordless handset and the external telecommunication circuit, and
b) the status of the base unit communicating with the external telecommunication circuit.

3. The communication system according to claim 1, further comprising:
electric-field intensity detecting means for detecting an electric-field intensity of a signal exchanged by wireless communication between each of the plurality of base units and the cordless handset,
wherein the display controlling means is configured to control the display means to display the connection-status information obtained by the connection-status-information obtaining means and the electric-field intensity detected by the electric-field intensity detecting means in such a manner that the connection-status information and the electric-field intensity are associated with the corresponding one of the plurality of base units.

4. The communication system according to claim 3, wherein, for each of the plurality of base units, the display controlling means is configured to display the identifier uniquely identifying the base unit among the plurality of base units, the connection-status information for the base unit, and the electric-field intensity for the base unit in an area on the display means.

5. A communication system comprising:
a plurality of base units disposed within a physical location, wherein each of the plurality of base units is configured to provide, for a cordless handset, a telecommunication connection to one or more communication devices external to the physical location; and
the cordless handset, wherein the cordless handset is configured to communicate wirelessly with each of the plurality of base units,
wherein the cordless handset includes:
a display; and
a controller that is configured to obtain connection-status information from at least one of the plurality of base units, the connection-status information indicating whether a corresponding base unit is performing communication, and is configured to control the display to display the connection-status information, wherein displaying the connection-status information includes displaying the connection-status information of the corresponding base unit along with an identifier of the corresponding base unit, wherein the identifier is unique among the plurality of base units,
wherein the controller is further configured to obtain information including:
a waiting status specifying that the base unit is not performing communication with any other cordless handset and that the base unit is not performing communication with any external telecommunication circuit,
information indicating an internal-line-communication status, wherein the internal-line communication status specifies that the base unit is only performing internal-line communication with another cordless handset, and
information indicating an external-line-communication status, wherein the external-line-communication status specifies that the base unit is performing external-line communication with an external telecommunication circuit, and wherein the controller is configured to display information on the display in such a manner that the waiting status, the internal-line-communication status, and the external-line-communication status are visually distinguishable from each other.

6. The communication system according to claim 5, further comprising:

an electric-field intensity detecting circuit configured to detect an electric-field intensity of a signal exchanged by wireless communication between each of the plurality of base units and the cordless handset, wherein the controller is configured to control the display to display the connection-status information and the electric-field intensity in such a manner that the connection-status information and the electric-field intensity are associated with the corresponding one of the plurality of base units.

7. The communication system according to claim 6, wherein, for each of the plurality of base units, the controller is configured to display the identifier uniquely identifying the base unit among the plurality of base units, the connection-status information for the base unit, and the electric-field intensity for the base unit in an area on the display.

8. The communication system according to claim 5, wherein the external-line-communication status includes both:

a) the status of the base unit communicating with the other cordless handset and the external telecommunication circuit, and b) the status of the base unit communicating with the external telecommunication circuit.

9. A cordless handset comprising:

a wireless communication unit configured to communicate with a plurality of base units disposed within a physical location, wherein the cordless handset is configured to obtain a telecommunication connection with one or more communication devices external to the physical location through the plurality of base units;

a display; and a controller that is configured to obtain connection-status information from at least one of the plurality of base units, the connection-status information indicating whether a corresponding base unit is performing communication, and is configured to control the display to display the connection-status information along with an identifier of the corresponding base unit, wherein the identifier is unique to the corresponding base unit among the plurality of base units, wherein the controller is further configured to obtain information including:

a waiting status specifying that the base unit is not performing communication with any other cordless handset and that the base unit is not performing communication with any external telecommunication circuit, information indicating an internal-line-communication status, wherein the internal-line-communication status specifies that the base unit is only performing internal-line communication with another cordless handset, and information indicating an external-line-communication status, wherein the external-line-communication status specifies that the base unit is performing external-line communication with an external telecommunication circuit, and wherein the controller is configured to display information on the display in such a manner that the waiting status, the internal-line-communication status, and the external-line-communication status are visually distinguishable from each other.

10. The cordless handset according to claim 9, further comprising:

an electric-field intensity detecting circuit configured to detect an electric-field intensity of a signal exchanged by wireless communication between each of the plurality of base units and the cordless handset, wherein the controller is configured to control the display to display the connection-status information and the electric-field intensity in such a manner that the connection-status information and the electric-field intensity are associated with the corresponding one of the plurality of base units.

11. The cordless handset according to claim 10, wherein, for each of the plurality of base units, the controller is configured to display the identifier uniquely identifying the base unit among the plurality of base units, the connection-status information for the base unit, and the electric-field intensity for the base unit in an area on the display.

12. The cordless handset according to claim 9, wherein the external-line-communication status includes both a) the status of the base unit communicating with the other cordless handset and the external telecommunication circuit, and b) the status of the base unit communicating with the external telecommunication circuit.

13. A base unit comprising:

a wireless communication unit configured to communicate with a cordless handset, the cordless handset configured to communicate wirelessly with the base unit and at least another base unit and wherein the base unit is disposed within a physical location and is configured to provide, for the cordless handset, a telecommunication connection to one or more communication devices external to the physical location; and a controller that is configured to output connection-status information to the wireless communication unit, the connection-status information including a waiting status indicating that the base unit is not performing communication with any other cordless handset and that the base unit is not performing communication with any external telecommunication circuit, wherein the wireless communication unit is further configured to transmit the connection-status information to the cordless handset, and wherein the controller is further configured to output a plurality of other types of connection-status information including:

an internal-line-communication status indicating that the base unit is only performing internal-line communication with another cordless handset, and an external-line-communication status indicating the base unit is performing external-line communication with an external telecommunication circuit.

14. The base unit according to claim 13, wherein the external-line-communication status further comprises:

a) the status of the base unit communicating with the other cordless handset and the external telecommunication circuit, and b) the status of the base unit communicating with the external telecommunication circuit.

15. The communication system of claim 1, wherein the cordless handset is further configured to determine the identifier of the base unit by determining a timing of a response from the base unit.

16. The communication system of claim 1, wherein the connection-status information includes the internal-line-communication status indicating that the base unit is only performing internal-line communication with the other cordless handset.

* * * * *